United States Patent [19]
Estaque et al.

[11] Patent Number: 5,490,584
[45] Date of Patent: Feb. 13, 1996

[54] EDDY CURRENT BRAKE EQUIPMENT WITH TORQUE ESTIMATION

[75] Inventors: Michel Estaque, Taverny; Philippe Gernot, Suresnes, both of France

[73] Assignee: Labavia - S.G.E., Saint Quentin En Yvelines Cedex, France

[21] Appl. No.: 360,138

[22] Filed: Dec. 20, 1994

[30] Foreign Application Priority Data

Dec. 23, 1993 [FR] France ................................. 93 15584

[51] Int. Cl.⁶ ........................... H02P 15/00; B60L 7/28
[52] U.S. Cl. ........................ 188/164; 188/158; 310/105
[58] Field of Search ................................. 188/267, 158, 188/159, 161–165, 181 T; 310/105, 93; 318/765, 741, 721; 324/137; 364/424.1; 192/21.5; 303/112

[56] References Cited

U.S. PATENT DOCUMENTS

| | | | |
|---|---|---|---|
| 3,908,141 | 9/1975 | Lemonnier | 310/105 |
| 4,203,046 | 5/1980 | Homann et al. | 310/105 |
| 5,054,587 | 10/1991 | Matsui et al. | 188/267 |
| 5,143,183 | 9/1992 | Kuwahara | 188/158 |
| 5,145,038 | 9/1992 | Kuwahara | 188/158 |
| 5,154,623 | 10/1992 | Kuwahara | 188/164 |

FOREIGN PATENT DOCUMENTS

| | | |
|---|---|---|
| 0466941 | 1/1992 | European Pat. Off. . |
| 0479674 | 4/1992 | European Pat. Off. . |

OTHER PUBLICATIONS

Patent Abstracts of Japan, vol. 11, N°44, Feb. 1987 & JP-A-61 206 829 (Toyota Motor Corp.) Sep. 1986.
Patent Abstracts of Japan, vol. 14, N°99, Feb. 1990 & JP-A-01 303 100 (Toshiba Corp.) Dec. 1989.

*Primary Examiner*—Douglas C. Butler
*Attorney, Agent, or Firm*—Larson and Taylor

[57] ABSTRACT

Eddy current brake equipment includes a stator assembly and a rotor assembly adapted to be mounted on a transmission shaft of a vehicle. One of those assemblies includes inductor windings and the other assembly includes an armature facing the inductor windings. The inductor windings are selectively excited from an electricity source of the vehicle in response to a power feed setting. A processor is provided to estimate the braking torque that the equipment can provide as a function of the speed of rotation of the rotor assembly, of the temperature armature, and of the temperature of the inductor windings, and of at least one value for the power feed setting.

10 Claims, 2 Drawing Sheets

EDDY CURRENT BRAKE EQUIPMENT WITH TORQUE ESTIMATION

BACKGROUND OF THE INVENTION

The present invention relates to eddy current equipment for braking a vehicle.

Equipment of this type conventionally comprises a portion (stator) that is fixed to the chassis of the vehicle and that includes inductor windings, and a moving portion (rotor) including an armature, and coupled to a rotary element of the vehicle, generally its transmission shaft. In certain eddy current braking equipments to which the invention can also be applied, the inductor windings are carried by the rotor and the armature is carried by the stator (see FR-A-2 667 741, for example).

The term "inductor winding" or more simply "winding" is used herein to cover both an inductor winding proper and a group of such windings that are permanently interconnected in series and/or in parallel. Each winding as defined in this way produces a magnetic field when powered by the vehicle battery.

The armature is a body of ferromagnetic material which, when moving relative to excited windings, has electrical currents known as "eddy" currents induced therein. Because of the resistivity of the armature, these eddy currents cause energy to be dissipated, and this results in the rotor, and thus the vehicle, being slowed down. The energy is dissipated in the form of heat, and the rotor is commonly given a finned configuration suitable for disposing of said heat.

The driver of the vehicle can actuate a multi-position control lever to obtain a braking effect on the vehicle with a torque that varies depending on the position selected for the lever. This variability is obtained by a set of relays each serving to excite one of the windings, with the number of relays in the closed-circuit position depending on the position of the lever. In a typical equipment, there are four inductor windings, and the lever has five positions corresponding respectively to 0, 1, 2, 3, and 4 of the relays being closed, with corresponding proportional braking torques being obtained.

In the above-mentioned application FR-A-2 667 741, there is described a way of determining the braking torque obtained by a brake having a rotary inductor winding, the determination being based on measured variation in the voltage between two points of the stationary armature. That technique is not easily transposable to a brake having a stationary inductor winding and a rotary armature. In addition, since it is based on measuring an effect of the inductor excitation, it does not make it possible to determine the braking torque that would be obtained for a feed setting other than that actually being applied. However, this type of information can be very useful in the context of intelligent management of the various braking resources of the vehicle (electromagnetic brake, disk brakes, engine braking.

An object of the present invention is to provide a brake equipment suitable for providing in simple manner information concerning the actual and/or available braking torque.

SUMMARY OF THE INVENTION

The invention thus provides an eddy current brake equipment for a vehicle, the brake equipment comprising a stator assembly and a rotor assembly adapted to be mounted on a transmission shaft of a vehicle, one of said assemblies including inductor windings and the other assembly including an armature facing the inductor windings. The brake equipment also includes excitation means for selectively exciting the inductor windings from an electricity source of the vehicle in response to a power feed setting. Processor means are provided to estimate the braking torque that can be provided by the equipment as a function of the speed of rotation of the rotor assembly, of the temperature of the armature, of the temperature of the inductor windings, and of at least one value for the power feed setting.

Applicants have observed that, surprisingly, a limited number of computation variables suffices to determine the braking torque. The way in which torque varies as a function of these variables can be determined beforehand by performing tests on a physical example of the model of brake under consideration. During testing, the torque provided by the brake is measured at different values of the computation variables. The recorded data can then be processed digitally to derive a function that approximates to the relationship between torque and the computation variables. The processor means included in brakes of the model in question are subsequently programmed with that function so as to be able to perform the desired estimation. Another method consists in storing test results in a memory associated with the processor means of each brake of the model in question, with access thereto being under the control of an address generated on the basis of the computation variables.

In general, a brake of the invention may have an inductor winding that is stationary or that is rotary.

A particular embodiment of the equipment of the invention further comprises a control member having a plurality of positions, and control means for establishing the power feed setting as a function in particular of the position of the control member, the processor means being adapted to estimate the braking torque as a function of the speed of the rotor assembly, of the temperature of the armature, of the temperature of the inductor windings, and of the value of the power feed setting established by the control means in order to estimate the braking torque actually produced by the equipment.

Alternatively, or additionally, the processor means may be adapted to estimate at least one value of the braking torque that would be produced by the equipment for a predetermined value of the power feed setting.

This facility of estimating the torque that is available at one or more feed settings is obtained because of the fact that each of the variables used in computing the torque can be measured or evaluated independently of the real operation of the brake.

In a particularly advantageous embodiment, the processor means are adapted to evaluate in real time the temperature of the armature at successive instants, the temperature of the armature at each instant of the succession being evaluated by the processor means as a function of a plurality of computation variables comprising the armature temperature evaluated at the preceding instant of the succession, the speed of rotation of the rotor assembly, and the power feed setting applied to the excitation means, with the armature temperature as estimated in this way being taken into account when estimating the braking torque. When the armature is included in the rotary assembly, this disposition makes it possible to determine the temperature of the armature without having to use a sensor that is difficult to install and which may provide unreliable measurements.

DESCRIPTION OF A PREFERRED EMBODIMENT

Figure 1:
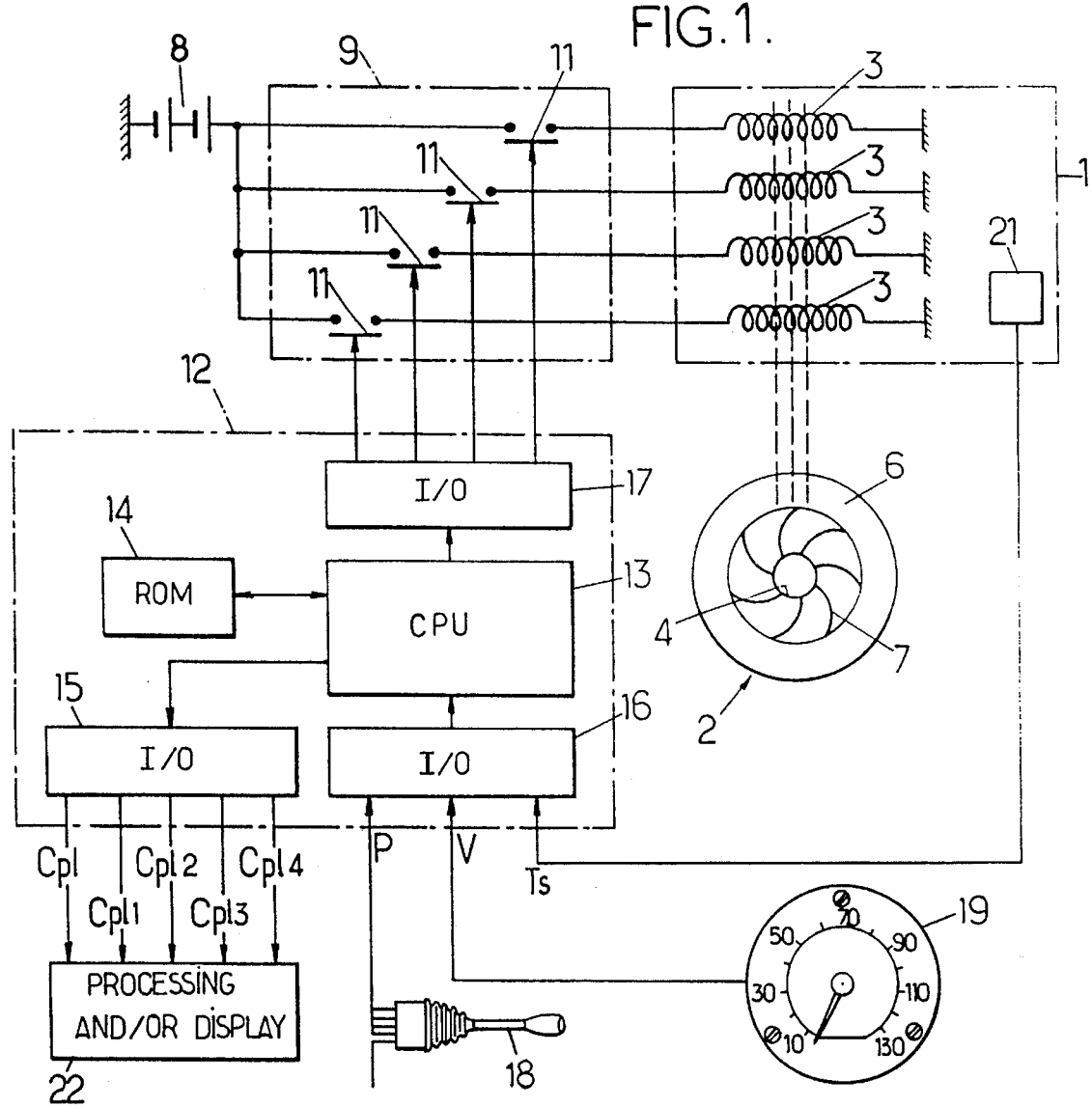
FIG. 1 is a circuit diagram of a brake equipment of the invention.

The invention is described below, by way of example, with reference to a brake in which the armature rotates. The four inductor windings 3 are included in a stator assembly 1, and the armature 6 is included in a rotor assembly 2.

Each winding 3 is constituted by a pair of coils, for example, with all eight coils being disposed about the transmission shaft (not shown) from the vehicle gear box, and having their axes parallel to said shaft. The rotor 2 is constituted by a piece of cast steel having a central bore 4 designed for mounting securely to the transmission shaft. The rotor 2 includes one or more disks perpendicular to the transmission shaft and constituting the armature 6 of the rotor. Between the armature 6 and the bore 4, each of the disks conventionally includes a finned structure 7 that provides ventilation while the transmission shaft is rotating. When the equipment is installed on a vehicle, the armature 6 is situated facing the windings 3 of the stator 1. In a typical embodiment, the rotor 2 includes one disk on either side of the stator, such that each rotating armature disk 6 faces a ring of magnetic poles as established by the windings 3 and of polarities that alternate from pole to pole. Rotation of the transmission shaft generates eddy currents in the armature 6 whenever at least one of the windings is electrically powered by the vehicle battery 8. As a result, braking torque is generated that increases with the number of windings that are excited, and simultaneously the armature heats up to an extent that is partially compensated by the ventilation from the fins 7.

The equipment includes excitation means 9 for selectively powering the windings 3 from the battery 8, which battery typically has a nominal voltage of 24 volts. The excitation means 9 are constituted by four relays 11 each mounted between the positive terminal of the battery and one end of a respective winding 3, the other end of each winding being connected to the negative terminal of the battery 8. The four relays 11 are independently controlled by four signals delivered by control means 12.

The control means 12 may be constituted by an electronic unit of the microcontroller type comprising a processor 13 associated with a memory 14 and with interface circuits 16 and 17. The input interface 16 receives various electrical signals, including:

a signal from a five-position manual control member 18 such as a lever accessible to the driver of the vehicle, which signal is representative of the position P of said member;

a signal from the tachometer 19 (illustrated as a dial in FIG. 1) that is associated with the transmission shaft for measuring its speed of rotation V; and a signal from a temperature sensor 21 mounted on the stator 1 and responsive to the temperature Ts of the windings 3.

The control means 12 may also receive other signals for performing other functions that are not explained herein since they are not directly concerned by the invention.

The input interface 16 shapes the above-mentioned signals and applies the corresponding values to the processor 13. The processor is programmed to establish a power feed setting C on the basis of the values P, V, and Ts received by the interface 16. Depending on the setting C, the processor 13 delivers four signals via its output interface 17 for opening or closing each of the relays 11. The setting C can take one of five values: 0, 1, 2, 3, or 4, causing a corresponding number of the relays 11 to be closed, i.e. causing a corresponding number of the inductor windings 3 to be excited.

To establish the power feed setting C, account is taken of an indication relating to the temperature Tr of the armature 6, which indication, according to the invention, is constituted by an evaluation of said temperature Tr that is obtained in real time by the processor 13.

Evaluation is performed at successive instants separated by predetermined time intervals $\Delta t$ that are sufficiently small compared with the time scale on which the armature temperature is likely to vary (e.g. $\Delta t = 1$ second). At each instant $t_n$ in the succession, the temperature $Tr_n$ of the armature 6 is evaluated as a function of the following computation variables:

the temperature $Tr_{n-1}$ of the armature as evaluated at the preceding instant $t_{n-1} = t_n - \Delta t$ in the succession;

the speed of rotation V of the rotor 2 as provided by the tachometer 19;

the power feed setting C whose value may be taken either at the evaluation instant $t_n$ or else at the preceding instant $t_{n-1}$; and the temperature Ts of the windings 3 as provided by the sensor 21.

The Applicant has determined that for most models of eddy current brake, the temperature of the armature can be evaluated with satisfactory accuracy by means of a polynomial function of the variables $Tr_{n-1}$, V, C, and Ts, such as:

$$Tr_n = Tr_{n-1} + a.\Delta t.kp.(b.V + c.Tr_{n-1} + d.V.Tr_{n-1} + e.Tr^2_{n-1} + f.V.Ts) \quad (1)$$

in which:
b = +(b1+b2.C)
c = −(c1+c2.C)
d = −(d1+d2.C)
e = +(e1+e2.C)
f = −f2.C
kp = 1+(kp0−1).V/3000, and a, b1, b2, c1, c2, d1, d2, e1, e2, f2, and kp0 are constant coefficients to be determined for each model, the speed V being expressed in revolutions per minute (rpm), the time interval $\Delta t$ in seconds, and the temperature $Tr_n$, $Tr_{n-1}$, and Ts in degrees Celsius.

To determine the coefficients a, b1, b2, c1, c2, d1, d2, e1, e2, f2, and kp0, it is possible to perform tests on a prototype of the brake. A large number of situations characterized by values of the test variables under consideration are reproduced on a test bench, and variations in the temperature of the armature over the time interval $\Delta t$ are measured. Each measurement provides a value of the function that relates $Tr_n$ to variables $Tr_{n-1}$, V, C, and Ts. The set of coefficients that provide the best approximation to the measurement results using equation (1) can then be calculated, e.g. by means of a conventional least square fit method as implemented on a computer.

A good match can be obtained in this way between equation (1) and the thermal behavior of the armature. In some cases, satisfactory matching can be obtained without including the winding temperature Ts in the computation variables, i.e. by setting f2=0. This can be explained by the fact that variations in the stator temperature are mainly due to variations in the armature temperature and in the power feed setting, such that the variable Ts can sometimes be omitted by an appropriate choice for the coefficients a, b1, b2, c1, c2, d1, d2, e1, e2, and kp0.

The set of coefficients and the data applicable to evaluating equation (1) is stored in the memory 14 of the control means 12 in each brake of the model under test. In operation, the temperature of the armature can thus be evaluated in real time by the processor 13 without there being any need for a special sensor and without suffering the drawbacks associated therewith.

To initialize the algorithm represented by equation (1) prior to putting the brake equipment into operation, it is possible, for example, to give the armature a starting temperature Tr0 equal to the measured temperature value Ts for the stator, or else to ambient temperature as provided by a thermometer.

The evaluated temperature $Tr_n$ is used to establish the power feed setting C for the time interval $\Delta t$ following evaluation. For example, the processor 13 compares the evaluated temperature $Tr_n$ with a predetermined threshold Tmax whose value is stored in the memory 14 and is selected as a function of the particular model of brake. So long as $Tr_n$ remains less than the threshold Tmax, the setting C corresponds to the position P of the control lever 18, with the vehicle driver then actuating the lever 18 so as to set directly the number of windings that are excited, thereby obtaining a proportional amount of braking torque. When $Tr_n$ exceeds the threshold Tmax, then the processor 13 forces the power feed setting C to a value that is lower than the number which corresponds to the position of the lever 18. This limits heating of the armature 6 and also of the stator 1 and, as explained in the introduction, this makes it possible to manage the electrical resources of the vehicle better without having too great an effect on the value of the braking torque since for given excitation, said value tends to decrease with increasing temperature of the armature.

Figure 2:
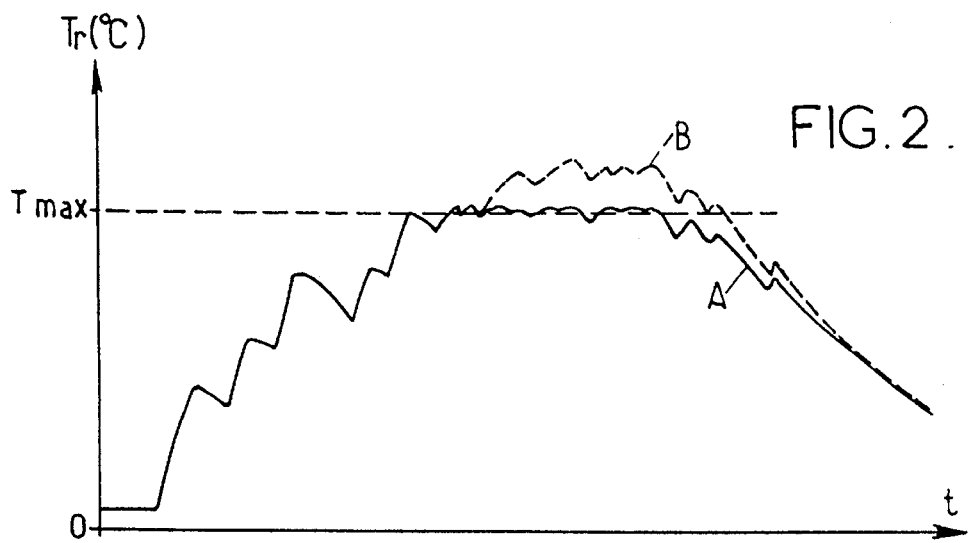
FIG. 2 is a graph showing one example of how the armature temperature may vary as a function of time in an equipment of the kind shown in FIG. 1.

This behavior is illustrated by the graph of FIG. 2 in which time is plotted along the horizontal axis and represents a simulation period of about 15 minutes. Curve A shows how the temperature of the armature Tr varies for a vehicle that is travelling downhill and where the driver is making use of various different positions of the lever 18. In practice, the temperature Tr never exceeds the threshold Tmax (about 630° C. in the example shown) except by very little, since whenever the threshold is reached, the power feed setting is reduced. Dashed line curve B shows how Tr would have varied under the same conditions if the temperature indication had not been taken into account. The threshold Tmax would have been greatly exceeded and although additional braking torque would have been obtained, that would have been at the cost of a significantly greater increase in electricity consumption. The final cooling portion of both curves A and B corresponds to the brake being deactivated, i.e. to the lever 18 being put into its position P=0. During this stage, the invention makes it possible to keep to a lower temperature (curve A lower than curve B) such that if a new braking requirement should occur prior to the armature having cooled down to ambient temperature, then the torque immediately available for braking purposes is greater than that which would have been available if temperature had not been taken into account.

In a variant of the invention, a sensor 21 is not used for measuring winding temperature Ts. The processor 13 can be programmed to evaluate the temperature Ts in similar manner using an algorithm of the same type as that described above.

To this end, it is possible to use a simpler equation of the type:

$$Ts_n = Ts_{n-1} + (g2.Tr_{n-1} - g1).\Delta t \qquad (2)$$

where $Ts_n$ and $Ts_{n-1}$ represent evaluated winding temperatures at instants $t_n$ and $t_{n-1}$ respectively, and where g1 and g2 are two constant coefficients to be determined experimentally as explained above for the other coefficients.

Another variant consists in determining the temperature Ts by measuring the voltage U and the current I taken by a winding 3 and calculating its resistance R=U/I therefrom. For the typical case of windings made of copper wire, resistance varies substantially as a function of temperature and can therefore be used for measuring temperature.

The processor 13 is also programmed, in accordance with the invention, to estimate the braking torque that the brake can provide as a function of the parameters V, Tr, Ts and one or more values of the feed setting C.

By way of example, this estimate can be performed with good accuracy using a function of the variables V, Tr, Ts, and C having the form:

$$X = C.V^\alpha.(K0 + K1.V + K2.Tr + K3.Ts + K4.V.Tr + K5.V.Ts + K6.Tr.Ts + K7.V^2 + K8.Tr^2) \qquad (3)$$

in which $\alpha$ and K0 to K8 are constant coefficients that need to be determined for each model of brake. In general, the exponent $\alpha$ lies in the range 0.3 to 0.5, the coefficients K0 and K1 are positive, and the coefficients K2 and K3 are negative, while the signs of the other coefficients K4 to K8 can vary from one model to another.

The coefficients $\alpha$ and K0 to K8 can be determined by performing tests on a prototype of the brake. A large number of situations (values of C, V, Tr, and TS) are reproduced on a test bench and the corresponding values of torque Cpl are measured, after which the set of coefficients for equation (3) that provide the best approximation to the results are calculated, e.g. by a digital least-square fit method.

Figure 3:
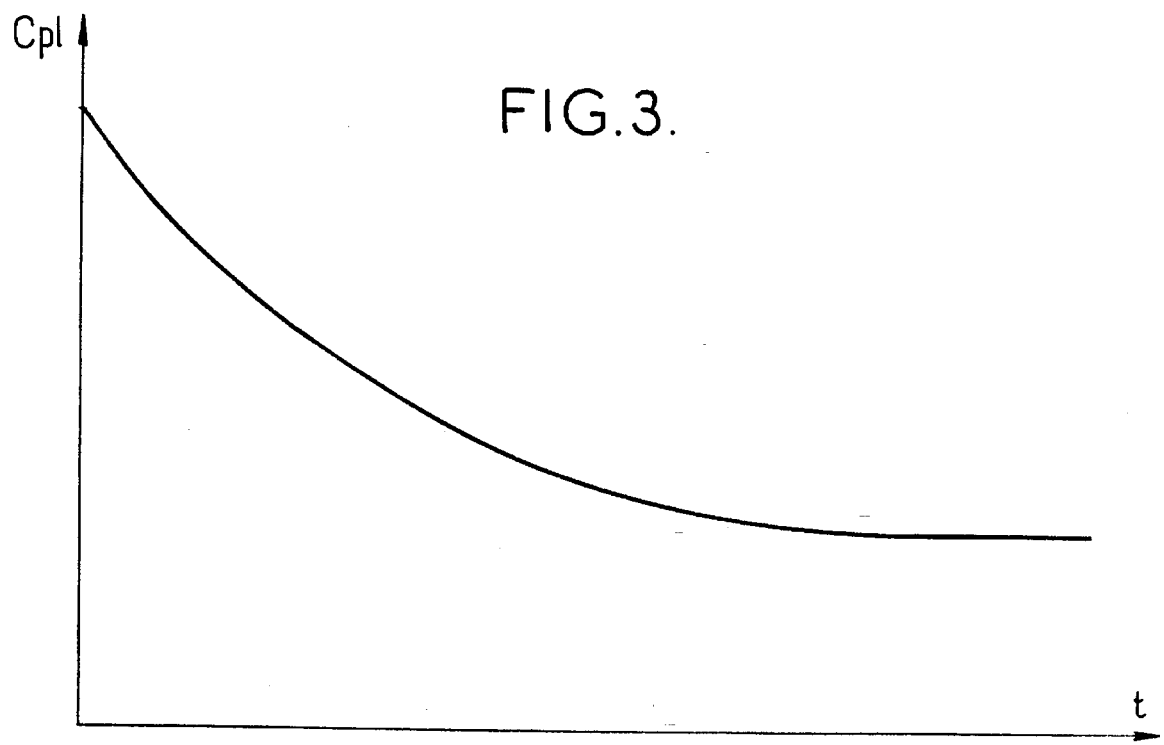
FIGS. 3 and 4 are graphs showing one way of determining the coefficients used when computing the torque in an equipment of the kind shown in FIG. 1.
Figure 4:
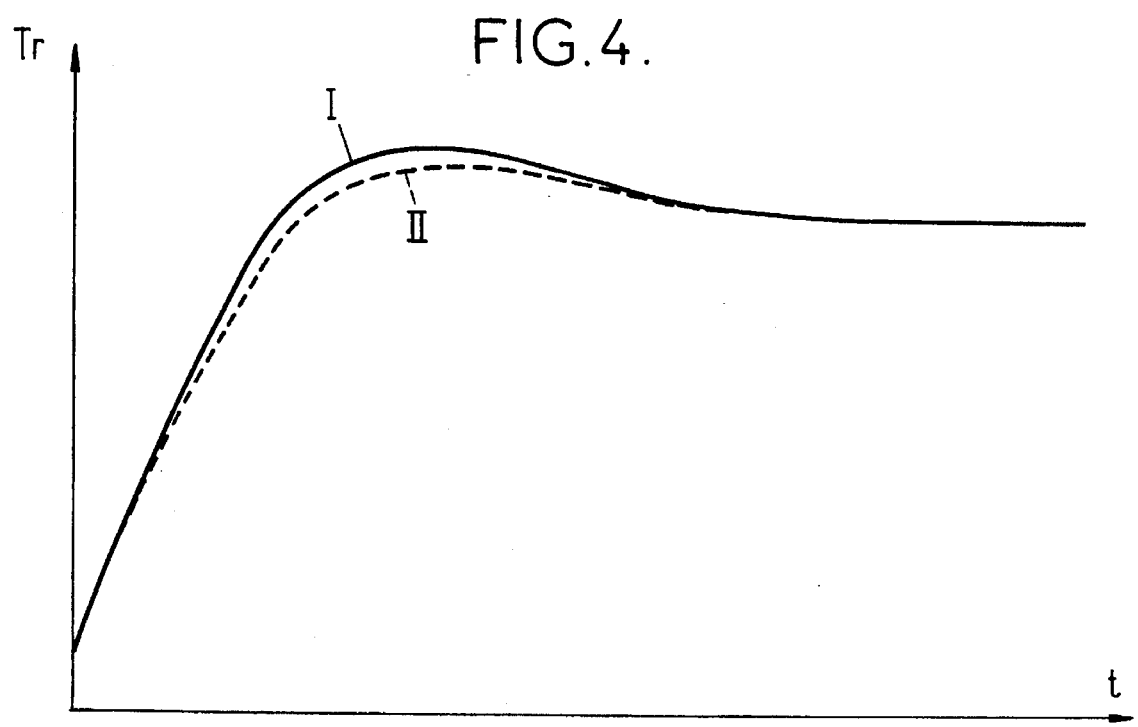

On the test bench, the rotor 2 is coupled to a motor that is sufficiently powerful to impose its speed of rotation, and the braking torque is deduced by measuring the reaction force to which the support of the stator 1 is subjected. A sequence of tests performed by imposing constant speed V and a given feed setting can cause the measured braking torque Cpl to vary over time in the manner shown in FIG. 3, with the long-term value of the torque being typically reduced to about one-third of its initial value because of heating. In parallel, the processor 13 is caused to implement algorithms corresponding to equations (1) and (2) so as to evaluate the temperatures Tr and Ts in real time. The typical appearance of the variation with time of the evaluated armature temperature Tr is as shown by curve I in FIG. 4, for example. The test sequence thus provides a series of quintuplets (Cpl, C, V, Tr, Ts) that are subsequently used for optimizing the choice of coefficients $\alpha$, K0 to K8.

If, in service, the temperature Ts of the windings 3 is not evaluated in application of equation (2) but is measured, then it must naturally also be measured during the testing stage so as to avoid loss of accuracy.

The same applies to the temperature Tr of the armature. In some brakes, this temperature can be measured by means of a sensor instead of being evaluated as in the example described in detail above. Under such circumstances, this temperature must also be measured during testing, thereby obtaining variation over time that has the appearance of curve II in FIG. 4, for example. The difference that may exist between curves I and II is due either to errors in the approximation provided by equation (1), or else to errors of measurement which are inevitable given the difficulty of accurately detecting the temperature of the rotating armature. It is important to use the same method of determining Tr during testing and in service since the difference will be greatest at high temperatures, and it is at high temperatures that variations in torque as a function of temperature are greatest.

The optimized coefficients α, K0 to K8 and the data useful for estimation in application of equation (3) are stored in the memory 14 of the control means 12 of each brake of the model that has been tested. In service, the processor 13 can apply equation (3) giving the feed setting C the value that it has determined in the manner explained above for controlling the excitation means 9. In this way, the torque X=Cpl as actually produced by the brake is estimated. This estimate Cpl is delivered via the output interface 15 to an external device 22 serving, for example, to perform centralized management of the various braking resources of the vehicle. The estimate Cpl can also be displayed so that the driver is aware of the effectiveness of braking and takes the necessary steps, where appropriate.

The processor 13 may also apply equation (3) with one or more predetermined values for the setting C. Estimates are thus made of the torque X=Cpl1, Cpl2, Cpl3, or Cpl4 that would be available for excitation at C=1, 2, 3, or 4. In the example shown in FIG. 1, the four estimates Cpl1 to Cpl4 are delivered to the external device 22 in addition to the estimate of the actual torque Cpl. Since torque is directly proportional to the variable C in equation (3), it is also possible to supply the device 22 merely with the setting C as established by the processor 13 and the value, e.g. Cpl1, of the estimated torque.

It will be observed that the invention can be applied to various types of eddy current brake, and in particular that in certain cases it would be possible for the way in which the inductor windings are controlled to be very different from that described herein by way of example.

We claim:

1. Eddy current brake equipment for a vehicle, the brake equipment comprising a stator assembly and a rotor assembly adapted to be mounted on a transmission shaft of a vehicle, one of said assemblies including inductor windings and the other assembly including an armature facing the inductor windings, the brake equipment also including excitation means for selectively exciting the inductor windings from an electricity source of the vehicle in response to a power feed setting, and processor means to estimate the braking torque that can be provided by the equipment as a function of the speed of rotation of the rotor assembly, of the temperature of the armature, of the temperature of the inductor windings, and of at least one value for the power feed setting.

2. Equipment according to claim 1, further comprising a control member having a plurality of positions, and control means for establishing the power feed setting as a function of the position of the control member, the processor means being adapted to estimate the braking torque as a function of the speed of the rotor assembly, of the temperature of the armature, of the temperature of the inductor windings, and of the value of the power feed setting established by the control means in order to estimate the braking torque actually produced by the equipment.

3. Equipment according to claim 1, wherein the processor means are adapted to estimate at least one value of the braking torque that would be produced by the equipment for a predetermined value of the power feed setting.

4. Equipment according to claim 1, wherein the stator assembly includes the inductor windings while the rotor assembly includes the armature, and wherein the processor means are adapted to evaluate in real time the temperature of the armature at successive instants, the temperature of the armature at each instant of the succession being evaluated by the processor means as a function of a plurality of computation variables comprising the armature temperature evaluated at the preceding instant of the succession, the speed of rotation of the rotor assembly, and the power feed setting applied to the excitation means, with the armature temperature as estimated in this way being taken into account when estimating the braking torque.

5. Equipment according to claim 4, wherein said computation variables further comprise the temperature of the inductor windings.

6. Equipment according to claim 5, further comprising means responsive to the temperature of the inductor windings and applying a signal to the control means representative of the inductor winding temperature included in the computation variables.

7. Equipment according to claim 5, wherein the inductor winding temperature included in the computation variables is evaluated by the processor means at each instant of the succession as a function of the armature temperature and the inductor winding temperature as evaluated at the preceding instant of the succession.

8. Equipment according to claim 5, wherein the processor means are arranged to evaluate the armature temperature at each instant of the succession by an equation of the type:

$$Tr_n = Tr_{n-1} + a.\Delta t.kp.(b.V + c.Tr_{n-1} + d.V.Tr_{n-1} + e.Tr^2_{n-1} + f.V.Ts)$$

in which:

b=+(b1+b2.C)

c=−(c1+c2.C)

d=−(d1+d2.C)

e=+(e1+e2.C)

f=−f2.C kp=1+(kp0−1).V/3000, and a, b1, b2, c1, c2, d1, d2, e1, e2, f2, and kp0 are constant coefficients;

$\Delta t$ designates the time interval between said instant and the preceding instant in the succession;

V designates the speed of rotation of the rotor assembly;

C designates the power feed setting applied to the excitation means and is equal to the number of windings that are powered;

Ts designates the inductor winding temperature; and $Tr_n$ and $Tr_{n-1}$ designate the armature temperature respectively at said instant and at the preceding instant in the succession.

9. Equipment according to claim 4, further comprising a control member having a plurality of positions and control means for establishing the power feed setting as a function in particular of the position of the control member, and wherein the control means are arranged to modify automatically the power feed setting applied to the excitation means whenever the armature temperature evaluated by the processor means exceeds a predetermined threshold in such a manner that the excitation means then connect the electricity source to a number of inductor windings that is smaller than the number which corresponds to the position of the control member.

10. Equipment according to claim 1, wherein the processor means are arranged to estimate a value X for the braking torque on the basis of an equation of the type:

$$X = C \cdot V^{\alpha}(K0 + K1 \cdot V + K2 \cdot Tr + K3 \cdot Ts + K4 \cdot V \cdot Tr + K5 \cdot V \cdot Ts + K6 \cdot Tr \cdot Ts + K7 \cdot V^2 + K8 \cdot Tr^2)$$

in which:

$\alpha$, K0, K1, K2, K3, K4, K5, K6, K7, and K8 are constant coefficients;

C designates the value of the power feed setting taken into consideration;

V designates the speed of rotation of the rotor assembly; and

Tr and Ts respectively designate the temperatures of the armature and of the inductor windings.

* * * * *